United States Patent
Yun

(10) Patent No.: US 10,737,668 B2
(45) Date of Patent: Aug. 11, 2020

(54) ELECTRONIC BRAKE SYSTEM AND CONTROL METHOD THEREOF

(71) Applicant: MANDO CORPORATION, Gyeonggi-do (KR)

(72) Inventor: Sangwon Yun, Seoul (KR)

(73) Assignee: MANDO CORPORATION, Gyeonggi-do (KR)

( * ) Notice: Subject to any disclaimer, the term of this patent is extended or adjusted under 35 U.S.C. 154(b) by 217 days.

(21) Appl. No.: 16/025,833

(22) Filed: Jul. 2, 2018

(65) Prior Publication Data

US 2019/0001939 A1    Jan. 3, 2019

(30) Foreign Application Priority Data

Jun. 30, 2017 (KR) ........................ 10-2017-0083694

(51) Int. Cl.

| | |
|---|---|
| *B60T 8/17* | (2006.01) |
| *B60T 13/68* | (2006.01) |
| *F16D 61/00* | (2006.01) |
| *B60T 13/14* | (2006.01) |
| *B60T 1/10* | (2006.01) |
| *B60T 8/00* | (2006.01) |
| *B60T 8/40* | (2006.01) |
| *B60T 8/36* | (2006.01) |
| *B60T 13/66* | (2006.01) |
| *B60T 7/04* | (2006.01) |

(52) U.S. Cl.
CPC ...... *B60T 8/17* (2013.01); *B60T 1/10* (2013.01); *B60T 7/042* (2013.01); *B60T 8/00* (2013.01); *B60T 8/36* (2013.01); *B60T 8/4081* (2013.01); *B60T 13/146* (2013.01); *B60T 13/662* (2013.01); *B60T 13/686* (2013.01); *F16D 61/00* (2013.01); *B60T 2270/604* (2013.01)

(58) Field of Classification Search
CPC ... B60T 8/17; B60T 1/10; B60T 7/042; B60T 8/00; B60T 8/36; B60T 8/4081; B60T 13/146; B60T 13/662; B60T 13/686; B60T 2270/604; F16D 61/00
See application file for complete search history.

(56) References Cited

U.S. PATENT DOCUMENTS

| | | | | |
|---|---|---|---|---|
| 2015/0022933 | A1* | 1/2015 | Parga-Cacheiro | .... H01F 7/1811 361/190 |
| 2017/0197600 | A1* | 7/2017 | Ohtsu | ........................ B60T 8/48 |

FOREIGN PATENT DOCUMENTS

| | | |
|---|---|---|
| JP | 5356363 | 9/2013 |
| JP | 5443571 | 12/2013 |

* cited by examiner

*Primary Examiner* — Melanie Torres Williams
(74) *Attorney, Agent, or Firm* — Ladas & Parry, LLP

(57) ABSTRACT

Disclosed are an electronic brake system and a control method thereof. The electronic brake system includes a first inner valve for transmitting hydraulic pressure to a first hydraulic circuit; a second inner valve for transmitting hydraulic pressure to a second hydraulic circuit; a first outer valve for discharging hydraulic pressure from the first hydraulic circuit; a second outer valve for discharging hydraulic pressure from the second hydraulic circuit; and an electronic control unit for generating a phase delay control signal for one inner valve when a current control signal is applied to the first inner valve and the second inner valve, and generating a phase delay control signal for one outer valve when a current control signal is applied to the first outer valve and the second outer valve.

10 Claims, 5 Drawing Sheets

ELECTRONIC BRAKE SYSTEM AND CONTROL METHOD THEREOF

CROSS-REFERENCE TO RELATED APPLICATION(S)

This application is based on and claims priority under 35 U.S.C. § 119 to Korean Patent Application No. 10-2017-0083694, filed on Jun. 30, 2017 in the Korean Intellectual Property Office, the disclosure of which is incorporated by reference herein in its entirety.

BACKGROUND

1. Technical Field

The present disclosure relates to an electronic brake system and a control method thereof, and more particularly, to an electronic brake system and a control method thereof for reducing vibrations in an integrated electronic brake system which provides an actuator composed of a master cylinder, a pedal simulator and the like, an electronic stability control (ESC) and a hydraulic power unit (HPU) as a single unit.

2. Description of the Related Art

In recent years, development of hybrid vehicles, fuel cell vehicles, electric vehicles and the like is actively proceeding in order to improve fuel efficiency and reduce exhaust gas. In such a vehicle, a braking apparatus, that is, a braking apparatus of a vehicle brake system is essentially installed, wherein the braking apparatus for a vehicle is an apparatus for reducing or stopping the speed of a running vehicle.

A conventional braking apparatus for a vehicle brake system includes a vacuum brake that generates a braking force using the suction pressure of an engine and a hydraulic brake that generates a braking force by using the hydraulic pressure.

An electronic brake system, which is a type of the hydraulic brake, generates a braking force by transmitting the braking hydraulic pressure to a master cylinder and wheel cylinders of respective wheels when a driver depresses a brake pedal.

In such an electronic brake system, an actuator composed of a master cylinder, a booster, a reservoir, a pedal simulator and the like, a modulator module for independently controlling a braking force of each wheel, and a HPU composed of motors, pumps, accumulators, valves and the like are constituted by respective units in order to control the braking hydraulic pressure transmitted to a wheel cylinder. At this time, the modulator module may be selectively provided with an anti-lock brake system (ABS), a traction control system (TCS), an electronic stability control system (ESC) and the like.

However, since the respective units constituting the electronic brake system are provided separately, there are problems that not only the securing of the mounting space is required due to the limitation of the mounting space of a vehicle but also the weight is increased. Accordingly, there is a demand for an advanced electronically controlled hydraulic braking system that ensures safety of a vehicle during braking, improves fuel efficiency, and has an appropriate pedal feel.

In addition, there is a problem that as two valves are controlled simultaneously when a braking Apply control or a Release control from the motor is performed, noise is generated due to superimposition of currents.

Therefore, research is underway to develop an electronic braking system that is simple in construction, easy to control, minimizes noise that may occur during valve opening and closing.

SUMMARY

It is an aspect of the present disclosure, which has been made to solve the above-described problems, to provide an electronic brake system for minimizing noise generated during control of a plurality of valves.

Further, it is an aspect of the present disclosure to provide an electronic brake system for minimizing the heat generation problem that may occur while minimizing noise generated during control of a plurality of valves.

Additional aspects of the present disclosure will be set forth in part in the description which follows and, in part, will be obvious from the description, or may be learned by practice of the disclosure.

In accordance with one aspect of the present disclosure, there may be provided an electronic brake system comprising: a first inner valve for transmitting hydraulic pressure to a first hydraulic circuit; a second inner valve for transmitting hydraulic pressure to a second hydraulic circuit; a first outer valve for discharging hydraulic pressure from the first hydraulic circuit; a second outer valve for discharging hydraulic pressure from the second hydraulic circuit; and an electronic control unit for generating a phase delay control signal for one inner valve when a current control signal is applied to the first inner valve and the second inner valve, and generating a phase delay control signal for one outer valve when a current control signal is applied to the first outer valve and the second outer valve.

Further, the current control signal may include a PWM (Pulse Width Modulation) control signal.

Further, when the phase delay control signal is generated for the one inner valve, the electronic control unit may calculate the phase delay control signal so that the superimposed currents of the current control signal applied to the first inner valve and the current control signal applied to the second inner valve are canceled.

Further, the electronic control unit may generate a 180-degree phase delay control signal for the one inner valve.

Further, when the phase delay control signal is generated for the one outer valve, the electronic control unit may calculate the phase delay control signal so that the superimposed currents of the current control signal applied to the first outer valve and the current control signal applied to the second outer valve are canceled.

Further, the electronic control unit may generate a 180-degree phase delay control signal for the one outer valve.

In accordance with another aspect of the present disclosure, there may be provided a method of controlling an electronic brake system comprising: a first inner valve for transmitting hydraulic pressure to a first hydraulic circuit; a second inner valve for transmitting hydraulic pressure to a second hydraulic circuit; a first outer valve for discharging hydraulic pressure from the first hydraulic circuit; and a second outer valve for discharging hydraulic pressure from the second hydraulic circuit, which comprises: generating a phase delay control signal for one inner valve when a current control signal is applied to the first inner valve and the second inner valve; and generating a phase delay control signal for one outer valve when a current control signal is applied to the first outer valve and the second outer valve.

Further, the current control signal may include a PWM (Pulse Width Modulation) control signal.

Further, generating a phase delay control signal for one inner valve when a current control signal is applied to the first inner valve and the second inner valve may generate a 180-degree phase delay control signal for the one inner valve.

Further, generating a phase delay control signal for one outer valve when a current control signal is applied to the first outer valve and the second outer valve may generate a 180-degree phase delay control signal for the one outer valve.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
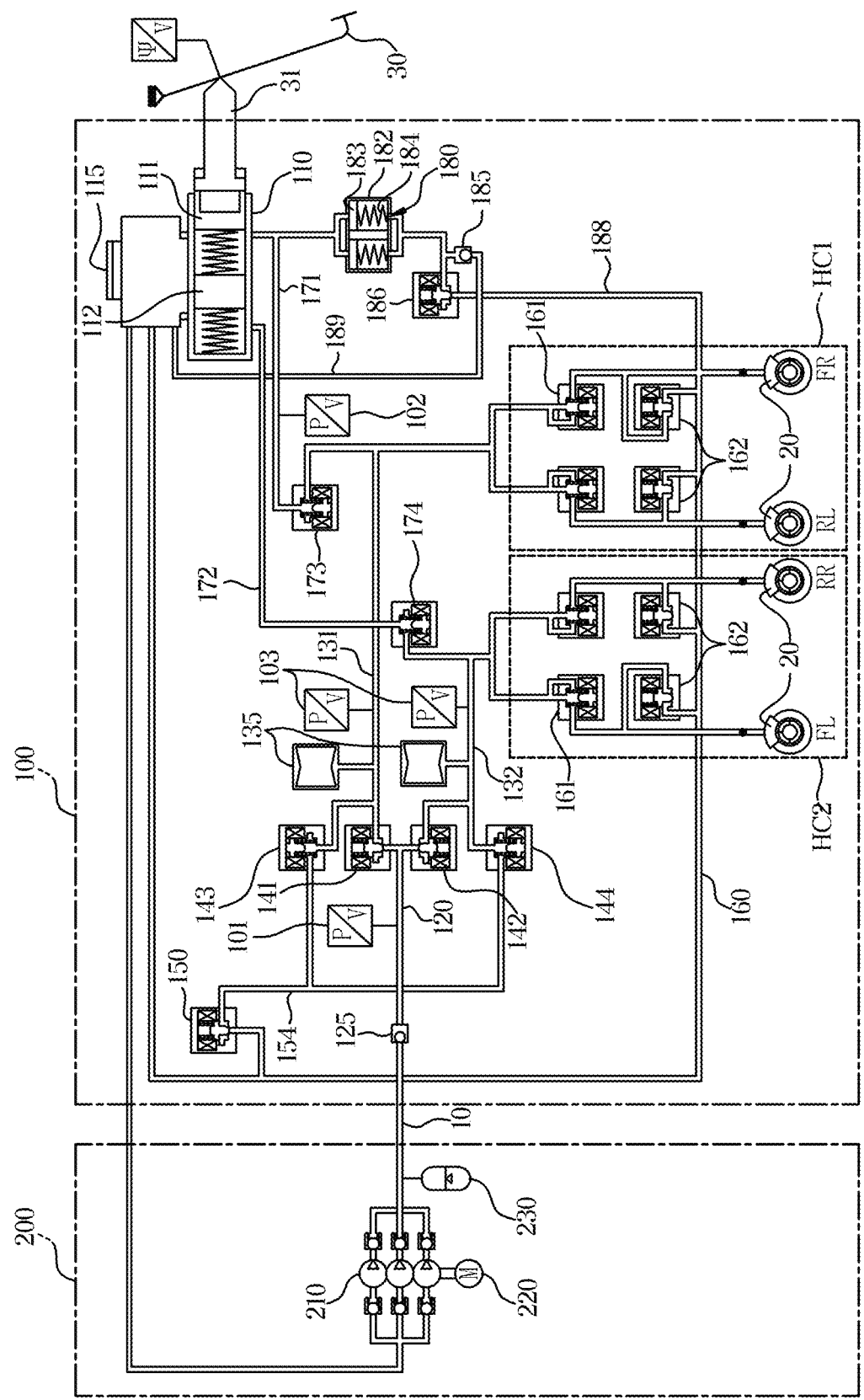
FIG. 1 is a hydraulic circuit diagram showing a non-braking state of an electronic brake system according to an embodiment of the present disclosure.

FIG. 1 is a hydraulic circuit diagram showing a non-braking state of an electronic brake system according to an embodiment of the present disclosure.

The electronic brake system according to the present disclosure may be largely composed of two units. For example, the electronic brake system may be composed of an integrated hydraulic control apparatus 100 and a power source unit 200. Referring to FIG. 1, the integrated hydraulic control apparatus 100 includes a brake pedal 30 operated by a driver during braking, a master cylinder 110 to which a force is transmitted from the brake pedal 30, a reservoir 115 coupled to an upper portion of the master cylinder 110 to store oil therein, two hydraulic circuits HC1 and HC2 respectively connected to two of wheels RR, RL, FR and FL, a pedal simulator 180 connected to the master cylinder 110 and provided to provide a reaction force of the brake pedal 30, and a simulation valve 186 provided on a flow passage 188 connecting the pedal simulator 180 and the reservoir 115. The power source unit 200 includes an accumulator 230 for storing a certain level of pressure, a pump 210 for sucking oil from the reservoir 115 and discharging the oil to the accumulator 230 in order to form a pressure in the accumulator 230, and a motor 220 for driving the pump 210.

Further, the integrated hydraulic control apparatus 100 may further include inner valves 141 and 142 and outer valves 143 and 144 connected to the respective hydraulic circuits HC1 and HC2, and pressure sensors 101, 102 and 103 in order to control the pressure transmitted from the reservoir 115 or the accumulator 230 to wheel cylinders 20 provided on the respective wheels FL, FR, RL, and RR.

The integrated hydraulic control apparatus 100 and the power source unit 200 are connected to each other by an external piping 10. That is, the accumulator 230 of the power source unit 200 and a hydraulic flow passage 120 of the integrated hydraulic control apparatus 100 are connected by the external piping 10. The reason why the power source unit 200 including the pump 210, the motor 220, and the accumulator 230 is constructed as a separate unit is to separate operation noise. In addition, in a case where the integrated hydraulic control apparatus 100 includes the master cylinder 110, the reservoir 115, and the pedal simulator 180 as a single unit and includes the functions of the ESC module and the HPU module, the weight of the entire electronic brake system may be reduced and the mounting space may be improved.

The structure and function of each component constituting such an electronic brake system will be described more specifically.

The master cylinder 110 may generate a fluid pressure with one chamber. However, in this embodiment, the master cylinder 110 is composed of two chambers to ensure safety in case of failure. A first piston 111 and a second piston 112 are provided in the chambers, respectively. The first and second pistons 111 and 112 are connected to two hydraulic circuits HC1 and HC2, respectively, and are pressed by an input rod 31 connected to the brake pedal 30 to generate the hydraulic pressure as the brake pedal 30 is pressed. The master cylinder 110 receives the oil through the reservoir 115 provided at the upper portion thereof and discharges the oil to the wheel cylinders 20 provided on the respective wheels RR, RL, FR and FL through an outlet provided at the lower portion thereof.

Although the electronic brake system according to the present embodiment is illustrated as being installed in an X-Split (cross-split) vehicle as shown, the present disclosure is not limited thereto. Herein, the cross-split means a vehicle in which the front wheels and the rear wheels are cross-braked when controlling the two front wheels FL and FR and the two rear wheels RL and RR. That is, the first hydraulic circuit HC1 of the two hydraulic circuits HC1 and HC2 is connected to the front right wheel FR and the rear left wheel RL of a vehicle and the second hydraulic circuit HC2 is connected to the front left wheel FL and the rear right wheel RR.

Each of the hydraulic circuits HC1 and HC2 includes flow passages connected to the wheel cylinders 20, and a plurality of valves 161 and 162 for controlling the hydraulic pressure are provided in the flow passages. As shown in the figure, the valves 161 are normally open type (hereinafter, referred to as NO type) solenoid valves which are disposed on upstream sides of the wheel cylinders 20 to control the hydraulic pressure transmitted to the wheel cylinders 20, and the valves 162 are normally closed type (hereinafter, referred to as NC type) solenoid valves which are disposed on downstream sides of the wheel cylinders 20 to control the hydraulic pressure exiting the wheel cylinders 20. The opening and closing operations of the solenoid valves 161 and 162 may be controlled by a commonly used electronic control unit (not shown).

Further, each of the hydraulic circuits HC1 and HC2 includes a return flow passage 160 connecting the NC type solenoid valves 162 and the reservoir 115. The return flow passage 160 is formed to discharge and return the hydraulic pressure transmitted to the wheel cylinders 20 to the reservoir 115. The return flow passage 160 is connected to the reservoir 115 and at the same time to the flow passage 188 provided with the simulation valve 186 which is will be described later. Accordingly, when the simulation valve 186 is opened and the hydraulic fluid flows from the pedal simulator 180, it is transmitted to the reservoir 115.

The pump 210 is configured as one more pumps in order to pump the oil introduced from the reservoir 115 to a high pressure to form a braking pressure, and the motor 220 for providing a driving force to the pump 210 is provided at one side of the pump 210. The motor 220 may be operated by receiving a pressing force of the brake pedal 30 according to a driver's braking will from the second pressure sensor 102 or a pedal displacement sensor (not shown) which will be described later.

The accumulator 230 is provided at an outlet side of the pump 210 and temporarily stores the high-pressure oil generated by the driving of the pump 210. That is, as described above, the accumulator 230 is connected to the hydraulic flow passage 120 by the external piping 10.

A check valve 125 is provided on the hydraulic flow passage 120 in order to prevent the oil from flowing backward. Further, the first pressure sensor 101 is provided on the hydraulic flow passage 120 to measure the oil pressure of the accumulator 230. The oil pressure measured from the first pressure sensor 101 is compared with a set pressure by an electronic control unit 40, and when the measured pressure is lower than the set pressure, the pump 210 is driven to suck the oil in the reservoir 115 and fill the accumulator 230. The hydraulic flow passage 120 is connected to the hydraulic circuits HC1 and HC2 through inflow passages 131 and 132.

The inflow passages 131 and 132 are composed of the first inflow passage 131 connected to the first hydraulic circuit HC1 and the second inflow passage 132 connected to the second hydraulic circuit HC2. The first inner valve 141 and the first outer valve 143 for controlling the braking oil stored in the accumulator 230 are provided on the first inflow passage 131, and the second inner valve 142 and the second outer valve 144 for controlling the braking oil stored in the accumulator 230 are provided on the second inflow passage 132. That is, the braking oil in the accumulator 230 may be transmitted to the wheel cylinders 20 by the first inflow passage 131 and the second inflow passage 132.

The first and second inner valves 141 and 142 are normally closed type solenoid valves that are normally closed, and first and second outer valves 143 and 144 are normally open type solenoid valves that are normally open. Accordingly, when a driver depresses the brake pedal 30, the first and second inner valves 141 and 142 are opened to transmit the brake oil stored in the accumulator 230 to the wheel cylinders 20, and the first and second outer valves 143 and 144 are closed.

According to an embodiment of the present disclosure, a control valve 150 for controlling the hydraulic pressure flowing through the first and second outer valves 143 and 144 to flow into the reservoir 115 is provided on a connection flow passage 154 connecting the return flow passage 160 connected to the reservoir 115 and the first and second outer valves 143 and 144. The control valve 150 is provided as a normally closed type solenoid valve that maintains a normally closed state, and opened when the hydraulic pressure is reduced to allow oil to be delivered to the reservoir 115. In addition, as the control valve 150 maintains a normally closed state, the control valve 150 serves to prevent the hydraulic pressure generated from the master cylinder 110 from flowing to the reservoir 115 when the electronic brake system is operated abnormally.

The integrated hydraulic control apparatus 100 may further include a pulsation damping devices 135 provided on the first inflow passage 131 and the second inflow passage 132 to minimize the pressure pulsation, respectively. The pulsation damping devices 135, which are devices capable of temporarily storing the oil to damp pulsation generated between the inner valve 141 and the outer valve 143 and the NO type solenoid valve 161, and between the inner valve 142 and the outer valve 144 and the NO type solenoid valve 161, respectively, is a well-known technique widely known in the technical field, and thus a detailed description thereof will be omitted.

The reference numeral '103' which is not explained is a third pressure sensor installed on the first and second inflow passages 131 and 132 to sense the braking hydraulic pressure transmitted to the first and second inflow passages 131 and 132. Accordingly, the pulsation damping devices 135 may be controlled such that the pulsation is reduced in accordance with the pressure of the braking oil sensed by the third pressure sensor 103.

According to the present disclosure, a first backup passage 171 and a second backup passage 172 for connecting the master cylinder 110 and the two hydraulic circuits HC1 and HC2 when the electronic brake system fails may be provided. A first shutoff valve 173 for opening and closing the first backup passage 171 is provided on the first backup passage 171, and a second shutoff valve 174 for opening and closing the second backup passage 172 is provided on the second backup passage 172. The first backup passage 171 is connected to the first inflow passage 131 via the first shutoff valve 173, and the second backup passage 172 is connected to the second inflow passage 132 via the second shutoff valve 174. In particular, the second pressure sensor 102 may be provided between the first shutoff valve 173 and the master cylinder 110 to measure the oil pressure of the master cylinder 110. Accordingly, during the braking in a normal state, the first and second backup passages 171 and 172 are blocked by the first shutoff valve 173 and the second shutoff valve 174, and a driver's braking will may be determined by the second pressure sensor 102.

The first and second shutoff valves 173 and 174 are provided as NO type solenoid valves that are normally open and actuated to close during normal braking. Accordingly, when the braking hydraulic pressure is transmitted to the wheel cylinders 20 through the first and second inflow passages 131 and 132, the first and second shutoff valves 173 and 174 are closed to smoothly transmit the oil to the wheel cylinders 20 without flowing oil into the backup passages 171 and 172.

According to the present disclosure, the pedal simulator 180 is provided between the second pressure sensor 102 and the master cylinder 110 to form a pedal force of the brake pedal 30.

The pedal simulator 180 includes a simulation chamber 182 provided so as to store the oil flowing out from an outlet side of the master cylinder 110, and the simulation valve 186 connected to a rear end portion of the simulation chamber 182. The simulation chamber 182 is provided with a piston 183 and an elastic member 184 and is formed to have a certain range of displacement by the oil introduced into the simulation chamber 182.

The simulation valve 186 is connected to the flow passage 188 connecting a rear end of the pedal simulator 180 and the reservoir 115. As shown in the figure, an inlet of the pedal simulator 180 is connected to the master cylinder 110, the simulation valve 186 is mounted at a rear end of pedal simulator 180, and an outlet of the simulation valve 186 is connected to the return flow passage 160 connected to the reservoir 115 via the flow passage 188, so that the pedal simulator 180, that is, the entire interior of the simulation chamber 182 is filled with oil.

The simulation valve 186 is provided as a normally closed type solenoid valve that maintains a normally closed state and is opened when a driver depresses the brake pedal 30.

A simulation check valve 185 is provided between the pedal simulator 180 and the master cylinder 110, that is, between the pedal simulator 180 and the simulation valve 186. The simulation check valve 185 is connected to the reservoir 115 by an oil passage 189 such that oil flows from the reservoir 115 to the simulation chamber 182. The simulation check valve 185 is configured such that a rear end pressure of the pedal simulator 180 according to a pedal force of the brake pedal 30 is transmitted only through the simulation valve 186. That is, as the piston 183 of the pedal simulator 180 presses the elastic member 184, the oil in the simulation chamber 182 is transmitted to the reservoir 115 through the simulation valve 186 and the flow passage 188. Accordingly, since the oil is filled in the simulation chamber 182, the friction of the piston 183 is minimized during the operation of the pedal simulator 180, so that the durability of the pedal simulator 180 is improved, and the inflow of foreign matter from the outside is blocked.

In addition, as oil is supplied to the simulation chamber 182 through the simulation check valve 185 when the pedal force of the brake pedal 30 is released, a fast return of the pressure of the pedal simulator 180 is assured. It is preferred that the simulation check valve 185 is composed of a check valve for piping without a spring so that the residual pressure of the pedal simulator 180 is returned when the pedal force of the brake pedal 30 is released.

The integrated hydraulic control apparatus 100 may be provided as a single block including the electronic control unit 40 electrically connected to each valve and sensor so that the electronic brake system can be made compact. That is, through the integrated hydraulic control apparatus 100 including the power source unit 200 constituted of the motor 220, the pump 210 and the accumulator 230, and the pedal simulator 180 for forming a pedal force of the brake pedal 30 with various valves and sensors as a single block form, the electronic braking system according to an embodiment of the present disclosure can easily secure a mounting space and solve a problem caused by weight increase.

Hereinafter, the operation of the electronic brake system according to the preferred embodiment of the present disclosure will be described in detail.

Figure 2:
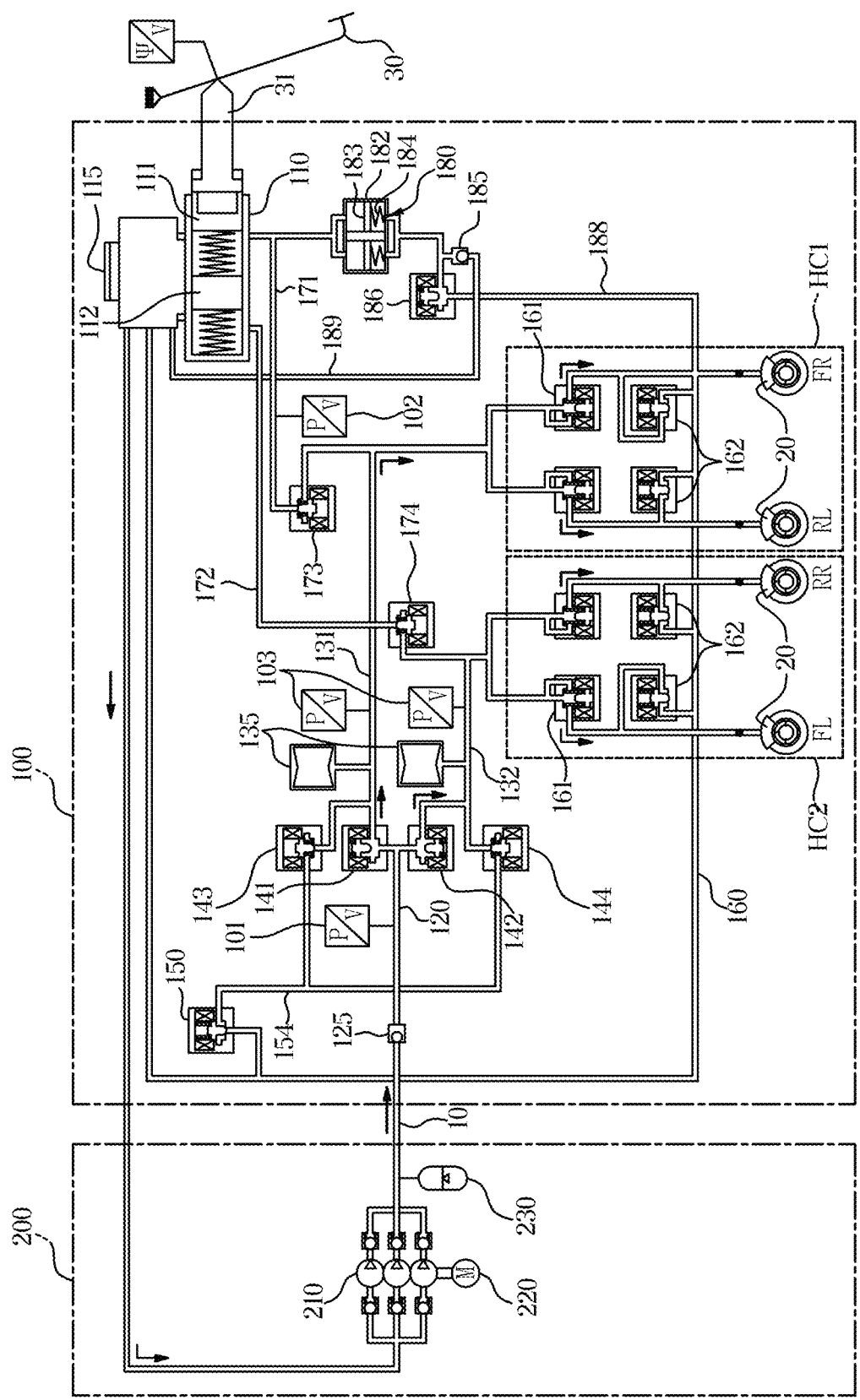
FIG. 2 is a hydraulic circuit diagram showing a normal operating state of an electronic brake system according to an embodiment of the present disclosure.

FIG. 2 is a hydraulic circuit diagram showing a normal operating state of an electronic brake system according to an embodiment of the present disclosure.

Referring to FIG. 2, when the braking by a driver is started, a demand brake amount of the driver may be sensed through the information of the pressure of the brake pedal 30 caused by the driver through the second pressure sensor 102 or the pedal displacement sensor (not shown). The electronic control unit 40 may receive a magnitude of the regenerative braking amount and may calculate a magnitude of the frictional braking amount according to the difference between the demand braking amount of the driver and the regenerative braking amount, and thus may grasp the magnitude of the pressure increase or the pressure decrease of the wheel side.

Specifically, when a driver depresses the brake pedal 30 at an initial stage of braking, the braking of the vehicle is sufficient with regenerative braking, so that the braking amount due to friction may be controlled so as not to occur. Therefore, it is necessary to depressurize the brake oil so that the hydraulic pressure generated in the master cylinder 110 by the pressing force of the brake pedal 30 is not transmitted to the wheel cylinders 20. At this time, by opening the out valves 143 and 144 to discharge the hydraulic pressure formed in the inflow passages 131 and 132 to the reservoir 115, it is possible to prevent the pressure on the wheels RR, RL, FR, and FL from being generated and maintain the brake pedal pressure.

Thereafter, the process of adjusting the friction braking amount according to the change of the regenerative braking amount may be performed. The amount of regenerative braking depends on the state of charge of the battery or the speed of the vehicle. Below a certain speed of the vehicle, the regenerative braking amount is rapidly reduced. In order to control the hydraulic pressure of the wheel cylinders 20 to cope with this situation, the first inner valve 141 may control the flow rate of the braking oil transmitted from the accumulator 230 to the first inflow passage 131, and similarly, the second inner valve 142 may control the flow rate of the braking oil transmitted from the accumulator 230 to the second inflow passage 132.

Thereafter, since there is no regenerative braking amount, it may be braked in accordance with a normal braking situation.

Meanwhile, the hydraulic pressure generated in the master cylinder 110 by the pressing force of the brake pedal 30 is transmitted to the pedal simulator 180 connected to the master cylinder 110. At this time, the simulation valve 186 provided on the flow passage 188 connecting the rear end of the pedal simulator 180 and the reservoir 115 is opened so that the oil filled in the simulation chamber 182 flows into the reservoir 115 through the simulation valve 186. Further, the pressure corresponding to the weights of the piston 183 and the elastic member 184 supporting the piston 183 provides the driver with a proper pedal feel through the simulation chamber 182. In addition, when the pressing force of the brake pedal 30 is released, a quick return of pressure in the pedal simulator 180 is ensured by oil being re-filled into the simulation chamber 182 through the simulation check valve 185.

The circuit diagram of the electronic brake system 1 capable of regenerative braking according to the present disclosure has been described above.

Hereinafter, a block diagram of the electronic brake system 1 according to the present disclosure will be described in detail.

Figure 3:
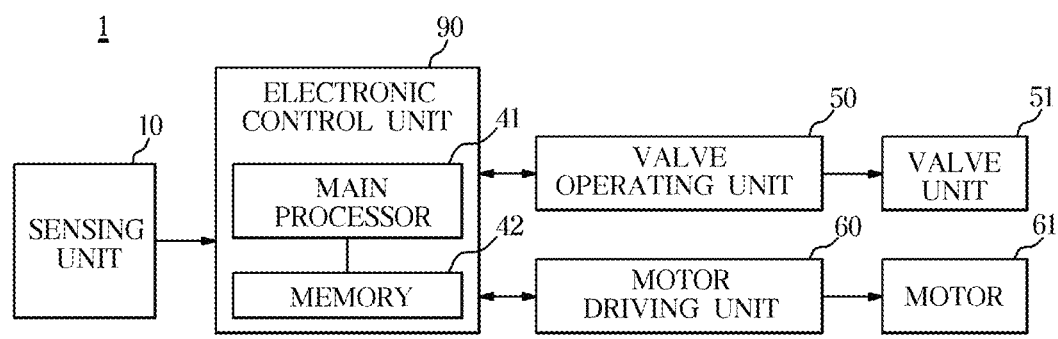
FIG. 3 is a block diagram of an electronic brake system according to an embodiment of the present disclosure.

Referring to FIG. 3 that is a block diagram of the electronic brake system according to an embodiment of the present disclosure, the electronic brake system 1 for a vehicle includes a sensing unit 10 for sensing pressure using the pressure sensors provided in the hydraulic circuits, the electronic control unit 40 for collectively controlling the electronic brake system 1, and a valve operating unit 50 and a motor driving unit 60 which are controlled by the electronic control unit 40.

Figure 4:
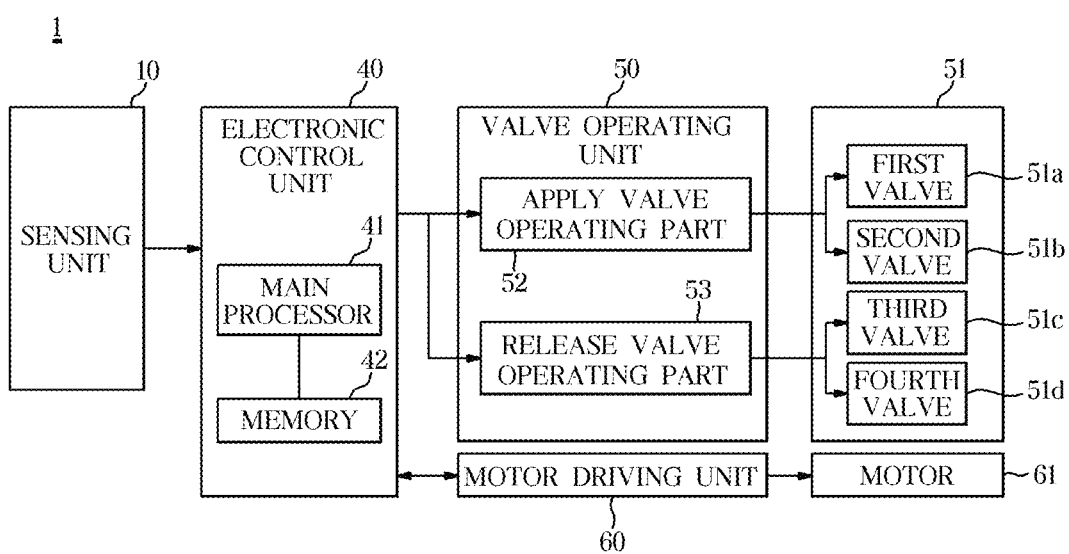
FIG. 4 is a detailed block diagram of an electronic brake system according to an embodiment of the present disclosure.

As illustrated in FIG. 4 that is a detailed block diagram of the electronic brake system according to an embodiment of the present disclosure, the valve operating unit 50 includes an Apply valve operating part 52 for performing braking Apply control and a Release valve operating part 53 for performing braking Release control.

Further, as illustrated in FIG. 4, the electronic brake system 1 includes a valve unit 51 including first to four valves 51a to 51d. The first and second valves 51a and 51b, which correspond to the first and second inner valves 141 and 142, are opened when a driver depresses the brake pedal 30 so that the braking oil stored in the accumulator 230 may be transmitted to the wheel cylinders 20.

Further, the third and fourth valves 51c and 51d, which correspond to the first and second outer valves 143 and 144 shown in FIG. 1, are opened when the braking hydraulic pressure needs to be reduced so that the hydraulic pressure formed in the inflow passages 131 and 132 may be discharged to the reservoir 115.

That is, the valve unit 51 of the electronic brake system 1 controls the opening and closing of the first valve 51a to the fourth valve 51d based on the control signal obtained from the valve operating unit 50, and in particular performs current control for opening and closing.

Further, the valve operating unit 50 may acquire a control signal from the electronic control unit 40, which collectively controls the electronic brake system 1, to drive the valve unit 51.

Hereinafter, each configuration of the electronic brake system 1 will be described in detail.

The sensing unit 10 includes a plurality of pressure sensors as in FIG. 1 which shows a circuit diagram of the electronic brake system 1. Specifically, the sensing unit 10 includes the pressure sensors 101, 102, and 103 shown in FIG. 1. Further, the sensing unit 10 may sense a demand braking amount of a driver through a pedal displacement sensor (not shown) based on the pressure information of the brake pedal 30 generated by the driver.

The electronic control unit 40 includes a main processor 41 for collectively controlling the electronic brake system 1 and a memory 42 for storing various programs and control methods.

In particular, the main processor 41 determines whether to open or close the valves based on the pressure information obtained from the sensing unit 10, and generates a control signal to operate the valves in accordance with the determination.

Specifically, when the driver presses the brake pedal 30, the main processor 41 generates a control signal so that the first and second inner valves 141 and 142 are opened to transmit the braking oil stored in the accumulator 230 to the wheel cylinders 20.

Specifically, the main processor 41 uses a current control method using PWM (Pulse Width Modulation) to determine the degree of opening of the valves in order to ensure an accurate braking pressure in accordance with the pressing force of the brake pedal 30 depressed by the driver. That is, the main processor 41 transmits a PWM control signal to the valve operation unit 50 to adjust the opening and closing degree of the valves.

Therefore, the main processor 41 may generate acoustic noise if the PWM driving frequency, which is a current control signal transmitted to the valve operation unit 50, is within an audible frequency range.

Figure 5:
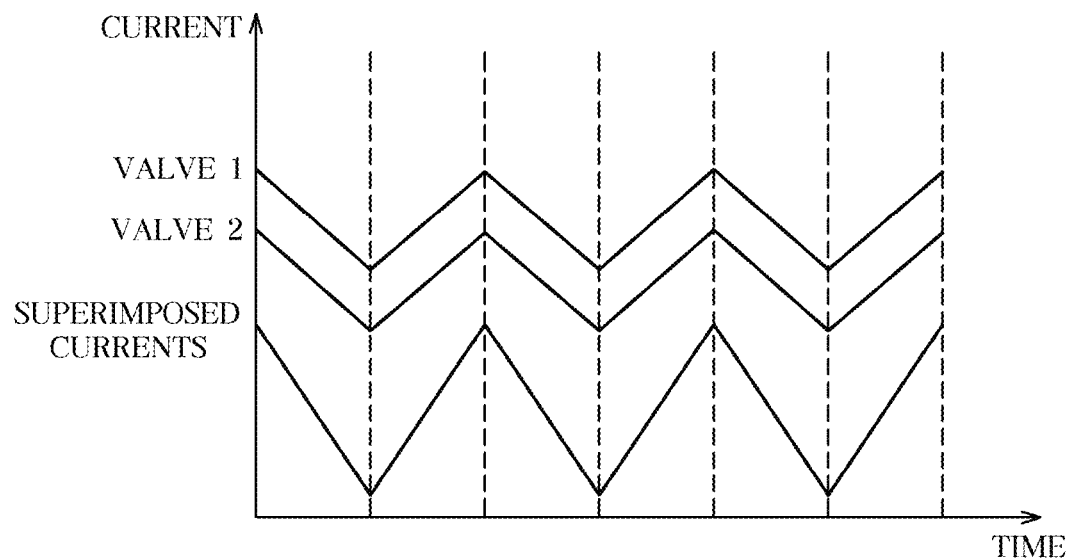
FIG. 5 is a graph showing currents flowing through a plurality of valves included in a conventional electronic brake system.

As a conventional example, FIG. 5 is a graph showing currents flowing through a plurality of valves included in a conventional electronic brake system.

In a case where valve 1 and valve 2 shown in FIG. 5 are the first inner valve 141 and the second inner valve 142 shown in FIG. 1, when a driver presses the brake pedal 30, the electronic control unit 40 generates the PWM control signal as shown in the figure based on the pressing force of the driver. That is, the current signal of the same waveform is applied to valve 1 and valve 2 based on the PWM control signal. However, at this time, there is a problem that a larger noise is generated when currents according to the PWM control signal applied to valve 1 and valve 2 are superimposed, such as the superimposed currents.

In this case, the model of a waveform may be a triangular waveform as shown in FIG. 5, but it is not limited thereto, and may be a sinusoidal waveform or the like.

Figure 6:
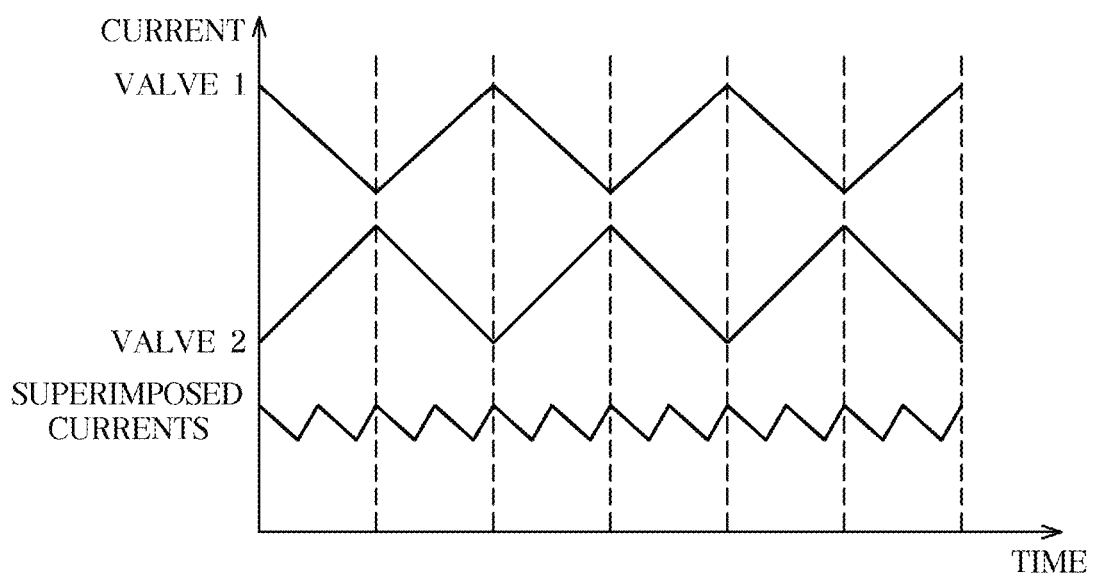
FIG. 6 is a graph showing currents flowing through a plurality of valves included in an electronic brake system according to an embodiment of the present disclosure.
Figure 7:
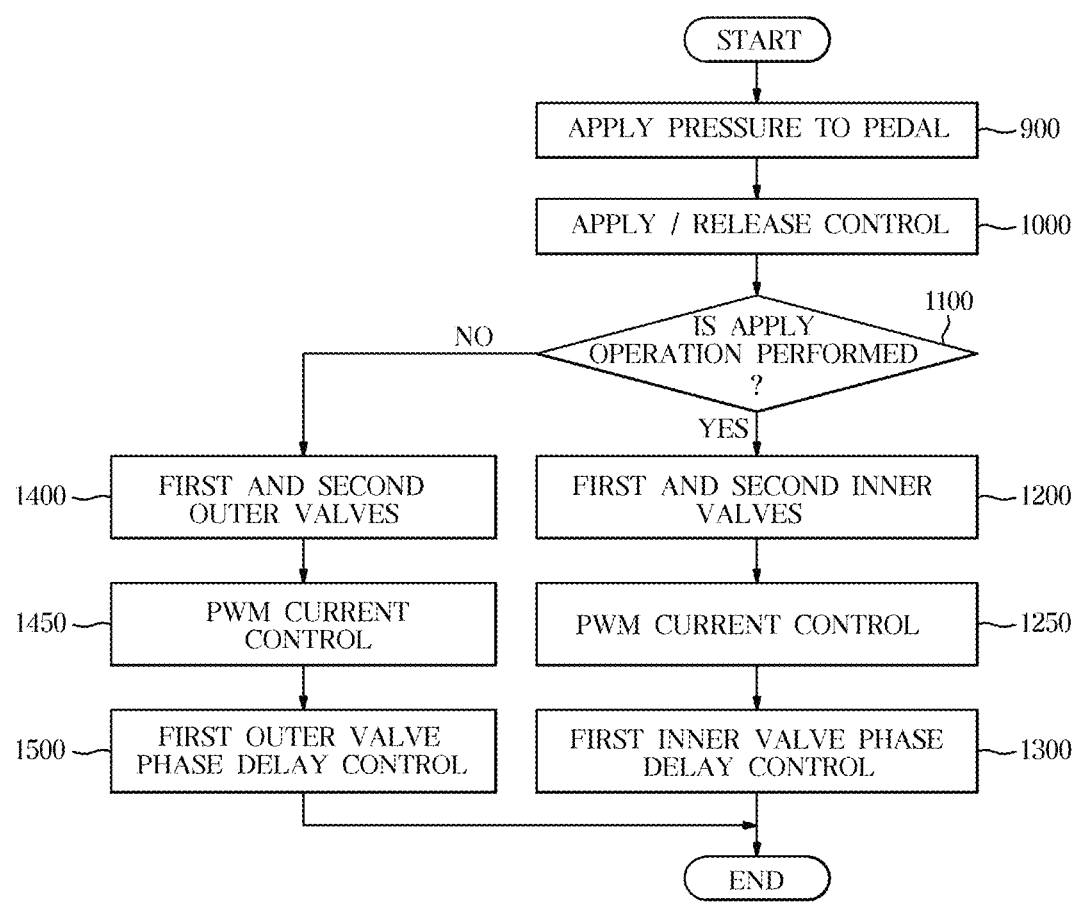
FIG. 7 is a flowchart showing a method of controlling an electronic brake system according to an embodiment of the present disclosure.

FIG. 6 is a graph showing currents flowing through a plurality of valves included in an electronic brake system according to an embodiment of the present disclosure. Specifically, in a case where valve 1 and valve 2 are the first inner valve 141 and the second inner valve 142 shown in FIG. 1, when a driver presses the brake pedal 30, the electronic control unit 40 generates the PWM control signal as shown in the figure based on the pressing force of the driver. However, the electronic control unit 40 performs a 180-degree phase delay control on one of the current flowing through the first inner valve 141 and the current flowing through the second inner valve 142, as shown in FIG. 6.

For example, when the current flowing through the second inner valve 142 is subjected to the 180-degree phase delay control, the superimposed currents may be relatively canceled, thereby reducing the acoustic noise.

The embodiment shown in FIG. 6 has been described in the case where valve 1 and valve 2 are the first inner valve 141 and the second inner valve 142 shown in FIG. 1. However, in a case where valve 1 is the first outer valve 143 and valve 2 is the second outer valve 144, the PWM current flowing through the one valve may be subjected to a 180-degree phase delay control so as to reduce noise that may be generated when the first and second outer valves 143 and 144 are opened and hydraulic fluid flows into the reservoir 115.

The motor driving unit 60 receives a control signal from the electronic control unit 40 and drives the motor 61. Specifically, the electronic control unit 40 receives the braking will of a driver from the pedal displacement sensor and controls the motor driving unit 60 to generate the motor driving signal, thereby driving the motor 61 which corresponds to the motor 220 shown in FIG. 1.

The configuration and operation of the valve operating unit for performing the valve operating method of the electronic brake system 1 according to the present disclosure has been described above.

Hereinafter, a method of controlling the valve operating current of the electronic brake system 1 according to the present disclosure will be described.

The electronic brake system 1 according to the present disclosure performs an Apply control or a Release control (1000) to perform braking control according to the pedal pressure when the brake pedal pressure is applied (900). Specifically, in order to perform the Apply control, the electronic control unit 40 may open the first and second inner valves 141 and 142 in the hydraulic circuit diagram shown in FIG. 1 to transmit the brake oil stored in the accumulator 230 to the wheel cylinders 20. In addition, when it is determined that the Release control should be performed, the electronic control unit 40 opens the first and second outer valves 143 and 144 to perform the Release control.

Specifically, when it is determined that the electronic brake system 1 is in the Apply operation (1100), the first and second inner valves 141 and 142 are operated (1200). Specifically, the electronic control unit 40 performs PWM current control to generate the hydraulic pressure corresponding to the pedal pressure applied by the driver (1250). Further, the electronic control unit 40 generates a control signal to delay the phase of the current applied to the first inner valve 141 by 180 degrees in order to cancel the acoustic noise generated during the PWM current control (1300). However, it is also possible to generate the control signal so as to delay the phase of the current applied to the second inner valve 142 other than the first inner valve 141 by 180 degrees.

Further, if the electronic brake system 1 is not an Apply operation, the first and second outer valves 143 and 144 are operated (1400). Specifically, the electronic control unit 40 performs PWM current control discharge a constant oil pressure to the reservoir so that an appropriate oil pressure corresponding to the driver's pedal force is generated (1450). Further, the electronic control unit 40 generates a control signal to delay the phase of the current applied to the first outer valve 143 by 180 degrees in order to cancel the acoustic noise generated during the PWM current control (1500). However, it is also possible to generate the control signal so as to delay the phase of the current applied to the second outer valve 144 other than the first outer valve 143 by 180 degrees.

As is apparent from the above, according to the present disclosure, noise generated during control of a plurality of valves can be minimized.

Further, according to the present disclosure, the heat generation problem that may occur while minimizing the noise generated during the control of a plurality of valves can be minimized.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
   a first inner valve for transmitting hydraulic pressure to a first hydraulic circuit;
   a second inner valve for transmitting hydraulic pressure to a second hydraulic circuit;
   a first outer valve for discharging hydraulic pressure from the first hydraulic circuit;
   a second outer valve for discharging hydraulic pressure from the second hydraulic circuit; and
   an electronic control unit for generating a phase delay control signal for one inner valve when a current control signal is applied to the first inner valve and the second inner valve, and generating a phase delay control signal for one outer valve when a current control signal is applied to the first outer valve and the second outer valve.

2. The electronic brake system according to claim 1, wherein the current control signal includes a PWM (Pulse Width Modulation) control signal.

3. The electronic brake system according to claim 1, wherein when the phase delay control signal is generated for the one inner valve, the electronic control unit calculates the phase delay control signal so that the superimposed currents of the current control signal applied to the first inner valve and the current control signal applied to the second inner valve are canceled.

4. The electronic brake system according to claim 3, wherein the electronic control unit generates a 180-degree phase delay control signal for the one inner valve.

5. The electronic brake system according to claim 1, wherein when the phase delay control signal is generated for the one outer valve, the electronic control unit calculates the phase delay control signal so that the superimposed currents of the current control signal applied to the first outer valve and the current control signal applied to the second outer valve are canceled.

6. The electronic brake system according to claim 5, wherein the electronic control unit generates a 180-degree phase delay control signal for the one outer valve.

7. A method of controlling an electronic brake system comprising: a first inner valve for transmitting hydraulic pressure to a first hydraulic circuit; a second inner valve for transmitting hydraulic pressure to a second hydraulic circuit; a first outer valve for discharging hydraulic pressure from the first hydraulic circuit; and a second outer valve for discharging hydraulic pressure from the second hydraulic circuit, which comprises:
   generating a phase delay control signal for one inner valve when a current control signal is applied to the first inner valve and the second inner valve; and
   generating a phase delay control signal for one outer valve when a current control signal is applied to the first outer valve and the second outer valve.

8. The method of controlling an electronic brake system according to claim 7,
   wherein the current control signal includes a PWM (Pulse Width Modulation) control signal.

9. The method of controlling an electronic brake system according to claim 7,
   wherein generating a phase delay control signal for one inner valve when a current control signal is applied to the first inner valve and the second inner valve generates a 180-degree phase delay control signal for the one inner valve.

10. The method of controlling an electronic brake system according to claim 7,
    wherein generating a phase delay control signal for one outer valve when a current control signal is applied to the first outer valve and the second outer valve generates a 180-degree phase delay control signal for the one outer valve.

* * * * *